Nov. 18, 1969　　SHINOBU MAKINO　　3,479,542
VIBRATOR
Filed Sept. 13, 1967　　4 Sheets-Sheet 1
FIG.1
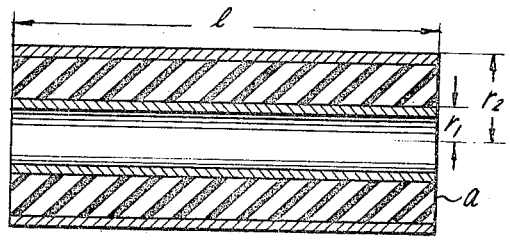
FIG.8
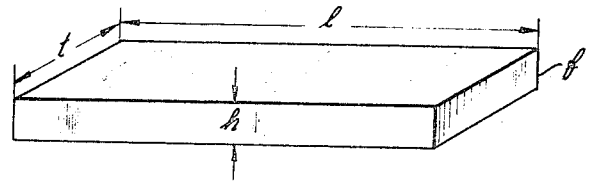
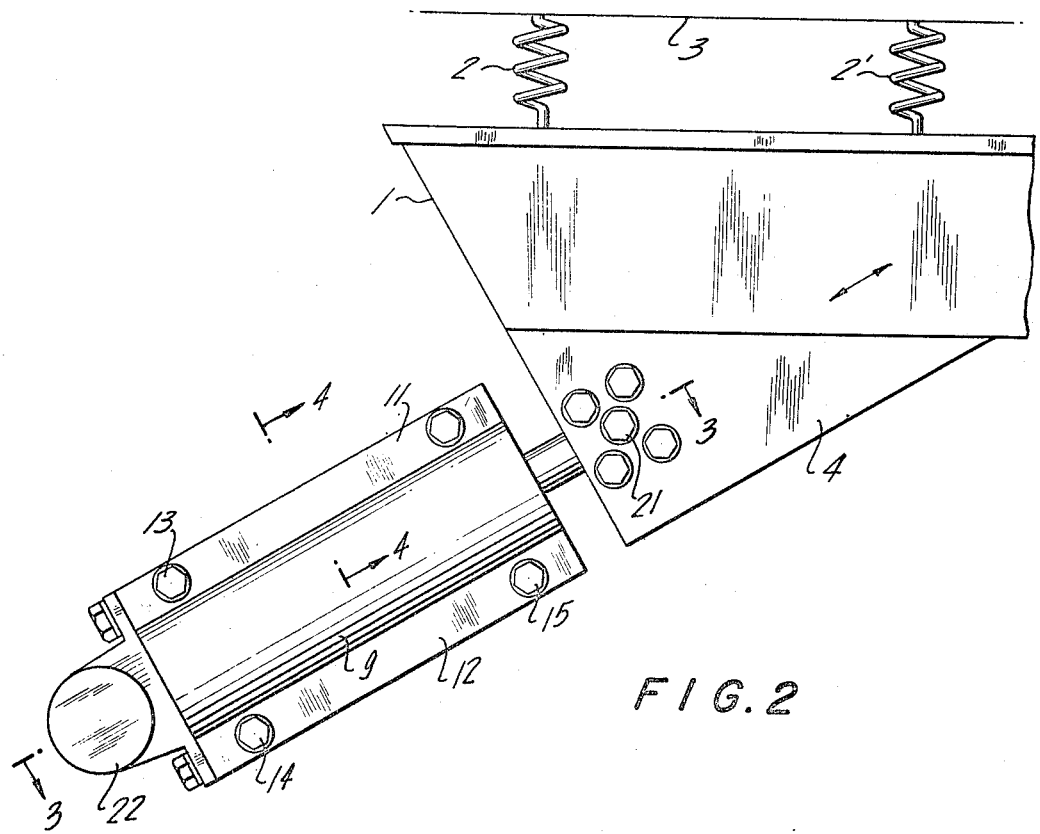
FIG.2

Nov. 18, 1969  SHINOBU MAKINO  3,479,542
VIBRATOR

Filed Sept. 13, 1967  4 Sheets-Sheet 3

Nov. 18, 1969    SHINOBU MAKINO    3,479,542
VIBRATOR

Filed Sept. 13, 1967    4 Sheets-Sheet 4

United States Patent Office 3,479,542
Patented Nov. 18, 1969

3,479,542
VIBRATOR
Shinobu Makino, Tokyo, Japan, assignor to Shinko Electric Co., Ltd., Toba, Mie-ken, Japan, a company
Filed Sept. 13, 1967, Ser. No. 667,519
Claims priority, application Japan, Sept. 13, 1966, 41/60,623
Int. Cl. H02k 7/00, 7/06
U.S. Cl. 310—81                                6 Claims

ABSTRACT OF THE DISCLOSURE

A vibrator for producing linear vibratory motion of an object such as a transfer trough for the purpose of transporting material in the transfer trough comprises a base member on which is mounted a pair of cylindrical rubber springs and driving means that are adapted to generate oscillatory motion. The components of each of the cylindrical springs comprise a hollow outer cylinder, a hollow resilient elastomeric cylinder disposed within the outer cylinder and an inner member, with the components proportioned so that the elastomeric cylinder is in a state of radial precompression. The outer cylinder is fastened to the base and the inner member is fastened to the transfer trough. The stiffness of the springs in shear is lower than the stiffness of the springs in compression. The base and the transfer trough form a two mass vibration system. The drive means are used to generate an oscillatory force at a frequency preferably slightly below the natural frequency of the two mass system in the shearing mode of the cylindrical springs with the result that the transfer trough experiences substantially linear vibratory motion.

---

This invention relates in general to vibrators and more particularly to vibrators employing elastomeric resilient elements.

Conventional vibrators, particularly large vibrators, have employed as resilient elements several layers of rectangular rubber plates with each rubber plate separated by steel compression plates. The installation of such a conventional vibrator requires a substantial amount of labor to precompress the rubber plates. Another problem with conventional vibrators has been difficulty in achieving linear vibratory motion. Several undesirable expedients have been resorted to in the past such as construction of vibrators having relatively high cost bearings to prevent vibration in unwanted directions and the use of two synchronous motors with two synchrous eccentric weights to cancel exciting forces in unwanted directions.

It is an object of this invention to provide a low cost vibrator of the resonance type having large load capacity and providing substantially linear vibratory motion.

Another object of this invention is to provide a low cost, compact vibrator, utilizing a cylindrical rubber spring so as to minimize the number of resilient assemblies.

Another object of this invention is to provide a low cost vibrator utilizing internal precompression of the resilient elements so as to minimize the labor required during the assembly and installation of the vibrator.

Another object of this invention is to provide a vibrator utilizing a single motor and one or more eccentric weights and capable of producing substantially linear vibratory motion.

Another object of this invention is to provide a vibrator utilizing a single electric motor and a belt connected eccentric weight.

Another object of this invention is to provide a vibrator having the driving force symmetrically disposed in relation to the resilient elements and the driving mass.

Another object of this invention is to provide a vibrator capable of being connected to an object to be vibrated and forming with that object a two mass vibrating system with a rubber resilient element connecting the two masses.

Other objects and a fuller understanding of the invention may be had by referring to the following description and claims, taken in conjunction with the accompanying drawing in which:

FIG. 1 is a cross-sectional view of a cylindrical rubber spring.

FIG. 2 is a side elevation of an embodiment according to the invention.

FIG. 8 is a perspective view of a conventional plate type rubber spring.

Figure 3:
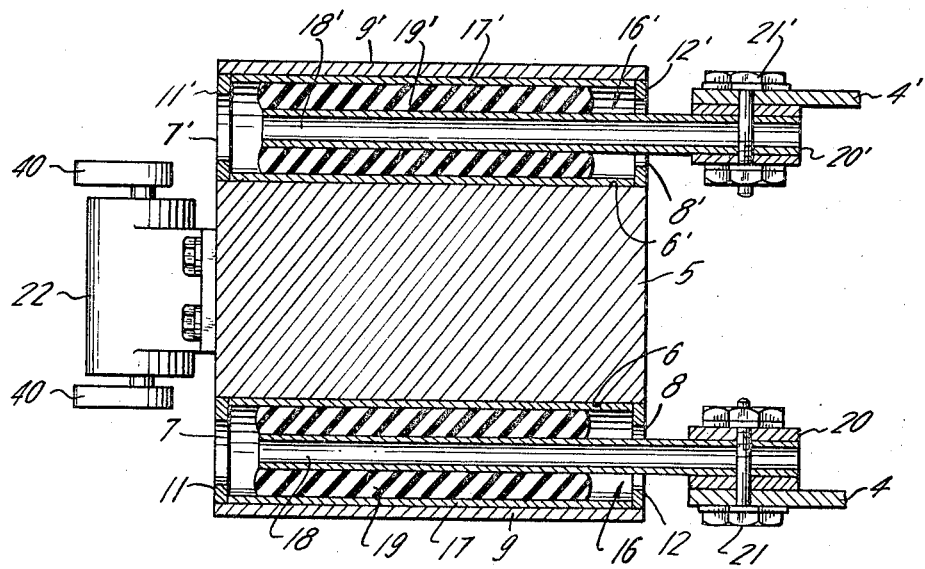
FIG. 3 is a cross-sectional view taken along the line 3—3 of FIG. 2.
Figure 4:
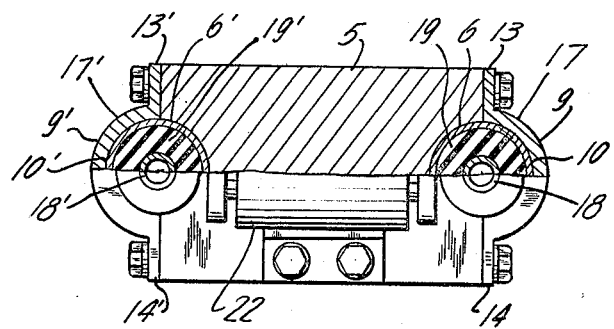
FIG. 4 is an end view partially in cross-section taken along the line 4—4 of FIG. 2.

With reference to the drawing, a vibrator in accordance with invention is shown as being attached to a transfer trough 1. As illustrated, the transfer trough 1, which is used for transportation of material, is suspended from a beam 3 by means of springs 2 and 2' and is disposed almost horizontally. A fitting 4 is attached to the trough 1 for the purpose of connecting the trough to a spring holder 5. The spring holder 5 is provided on one side with a groove 6 of semicircular shape in cross-section and a groove 6' on the side opposite groove 6, with the two grooves parallel to one another and of equal size. Flanges 7 and 8 and 7' and 8' are provided at the ends of grooves 6 and 6', respectively. Spring holder caps 9 and 9' have grooves 10 and 10' corresponding to grooves 6 and 6' respectively. At the ends of grooves 10 and 10' there are flanges 11 and 12 corresponding to flanges 7 and 8 and flanges 11' and 12' corresponding to flanges 7' and 8' respectively. The spring holder cap 9 has upper and lower flanges 13 and 14 fixed to the side of holder 5 by bolts 15. The spring holder cap 9' likewise has upper and lower flanges 13' and 14' fixed to the side of the holder 5 by bolts 15.

The spring holder 5 and the spring holder caps may be formed of cast iron, steel or other metal.

A cylindrical resilient rubber spring 16 consisting of a hollow cylindrical resilient rubber element 19 concentrically fixed between a metallic outer cylinder 17 of the length equivalent to the length of the groove 6 and a metallic inner cylinder 18 of greater length is fitted into the groove 6 and the outer cylinder 17 is held fixed to the spring holder by means of spring holder cap 9. The cylindrical resilient rubber spring 16' similarly consists of a metallic outer cylinder 17', a metallic inner cylinder 18' and a hollow cylindrical resilient element 19' and is held in groove 6' of the spring holder 5 by means of spring holder cap 9'.

The thickness of the cylindrical resilient elements 19 and 19' is defined as the outer radius, $r_2$ minus the inner radius, $\gamma_1$, and is preferably proportioned so that the largest displacement in the direction of compression is less than, or equal to, 20% of the thickness, and the largest vibratory amplitude is less than or equal to the thickness.

The resilient rubber element 19 of the rubber spring 16 is fixed on the outer peripheral surface of the inner cylinder 18 and is disposed at one end of inner cylinder 18. On the outer periphery of the cylindrical resilient element 19 there is an outer cylinder 17 greater in length and slightly smaller in the inner diameter than the uncompressed outer diameter of the cylindrical resilient element 19. The cylindrical resilient rubber element 19 is thus in a state of precompression in the radial direction (in the direction of thickness). Rubber spring 16' is similarly constructed.

The ends of the inner cylinders 18 and 18' project beyond the grooves 6 and 6' in front of the holder 5 on the end of the holder 5 closest to the transfer trough 1. The ends of the inner cylinders 18 and 18' are respectively fixed to the fittings 4 and 4' of the transfer trough by connecting members 20 and 20' and bolts 21 and 21'.

An A-C motor 22 having at least one unbalanced weight 40 mounted on its drive shaft is mounted on the rear end of spring holder 5, i.e., the end remote from the transfer trough. The drive shaft of the motor is at a right angle to the axial direction of the rubber springs 16 and 16' and the drive shaft is disposed in the plane formed by the longitudinal axes of rubber springs 16 and 16'. If only one unbalanced weight 40 is used, the motor is shifted axially from the position shown in FIG. 3 so as to position the single weight approximately midway between the rubber springs 16 and 16'.

Figure 5A:
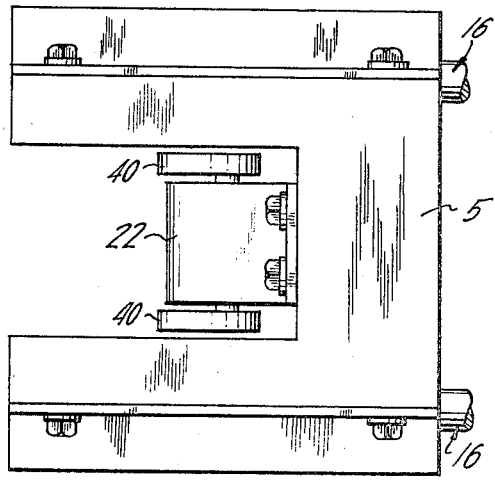
FIG. 5A is a top view of an embodiment according to the invention showing a first alternative drive arrangement.

In an alternative drive configuration (FIG. 5A), the motor 22 is disposed within a recess formed in spring holder 5. The recess is formed so that axis of the drive shaft of the motor on which there is mounted at least one eccentric weight 40 is disposed in a plane connecting the axes of the spring elements 16 and 16', and the motor is located between the elements 16 and 16'. FIG. 5A shows the motor provided with two eccentric weights and centered between the spring elements 19 and 19'. A modification of this configuration consists of having a motor provided with a single eccentric weight and suitably offset so that the eccentric weight is approximately centered between the spring elements.

Figure 5B:
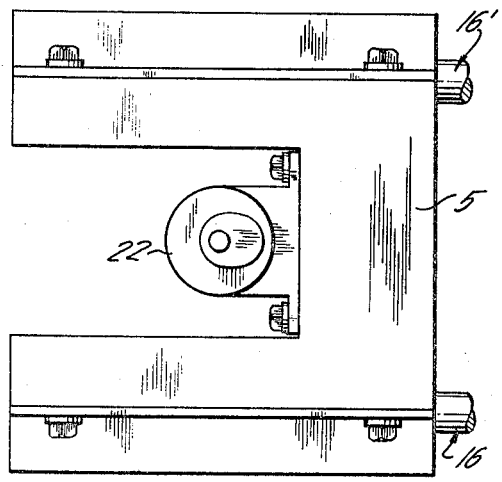
FIG. 5B is a top view of an embodiment according to the invention showing a second alternative drive arrangement.

In a second alternative drive configuration (FIG. 5B), the motor 22 provided with at least one eccentric weight is similarly mounted in a recess midway between the spring elements 16 and 16' but with the motor shaft perpendicular to the plane formed by the longitudinal axes of the elements 16 and 16'.

Figure 5C:
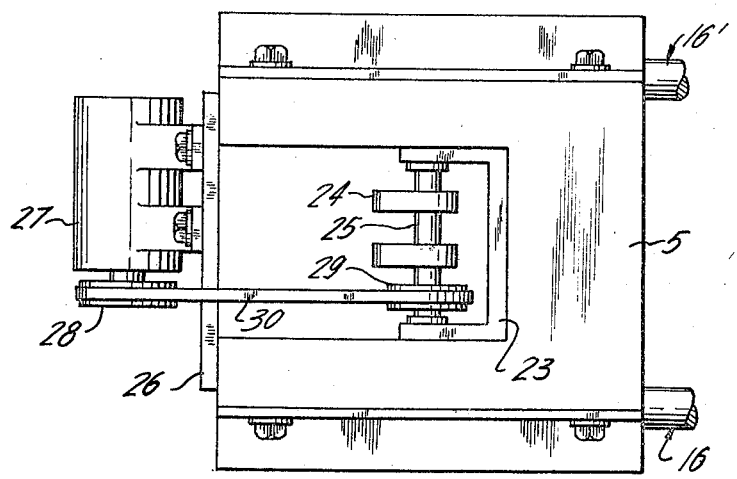
FIG. 5C is a top view of an embodiment according to the invention showing a third alternative drive arrangement.

In a third alternative drive configuration (FIG. 5C) a motor 27, without an eccentric weight, is mounted on the back of holder 5 by means of plate 26. One or more eccentric weights 24 are mounted on a rotatable shaft 25 that is mounted within a recess 23 in holder 5. A driving belt 30 connects pulleys 28 and 29 which are fixed respectively to the motor shaft and to the rotatable shaft 25 for the purpose of driving said rotatable shaft. The rotatable shaft may be disposed on a line connecting the centers of the spring elements 16 and 16'.

Although the motors described have been designated as A-C electric motors, other motor means such as a D-C electric motor, an air motor, a hydraulic motor or a gasoline engine may be employed as the driving means.

Furthermore, a variety of known methods may be applied in order to prevent the outer cylinders 17 and 17' from tending to move relative to the holder 5.

The resonant frequency for vibration of the transfer system mass and the drive system mass as coupled by the cylindrical springs is lower for the shear mode of the cylindrical springs than for the compression mode of the cylindrical springs. The resonant frequency for the shear mode of the cylindrical springs is given by the following formula: (wherein the effects of suspension springs 2 and 2' are considered negligible in the frequency range of interest):

$$f_0 = \frac{1}{\pi}\sqrt{\frac{K_s g}{W}}$$

where:

$f_0$=Resonant frequency
$K_s$=Spring constant of the cylindrical springs in the shear direction $$W = \frac{Wt(Wm)}{Wt + Wm}$$

$W_t$=Weight of the transfer system
$W_m$=Weight of the drive system
$g$=Acceleration due to gravity.

During operation of the vibrator, the motor is preferably operated at a frequency slightly lower than $f_0$. In the frequency range below $f_0$ the amplitude of the transfer trough 1 increases or decreases in proportion to the increase or decrease of the vibration frequency, while the transfer velocity of material is proportional to the product of said amplitude and the vibration frequency so that in said frequency range it is possible to greatly increase or decrease the transfer flow by slightly increasing or decreasing the vibration frequency.

Since the A-C motor 22 outer cylinders 17 and 17' of the cylindrical rubber springs 16 and 16' and the holder 5 are coupled as a rigid body, vibration of the motor is transmitted to the inner cylinders 18 and 18' and accordingly to the transfer trough by means of the resilient rubber elements 19 and 19'. The resilient rubber elements 19 and 19' are in a state of precompression in a radial direction. Since the spring constant in the compression direction of the rubber spring is larger than the spring constant in the shearing direction of the rubber spring, the resonant frequency for vibration in the compression direction is higher than the resonant frequency for vibration in the shearing direction, $f_0$. Therefore in the frequency range of actual operation the vibration components in the compression direction are transmitted to the transfer trough to a much smaller degree than the components of vibration in the shearing direction with the result that the transfer trough experiences substantially linear reciprocating motion.

In one example of a vibrating feeder, a vibrator of the type described, having a capacity of 300 ton/hr., has an A-C motor rotating at 1400 r.p.m. and two cylindrical rubber elements each having an inner diameter of 30 mm., an outer diameter of 50 mm. and a length of 360 mm. The dynamic spring constant in the shearing direction is 275 kg./mm. and the structural weight on the drive side and the structural weight on the transfer side each being about 340 kg.

Figure 6:
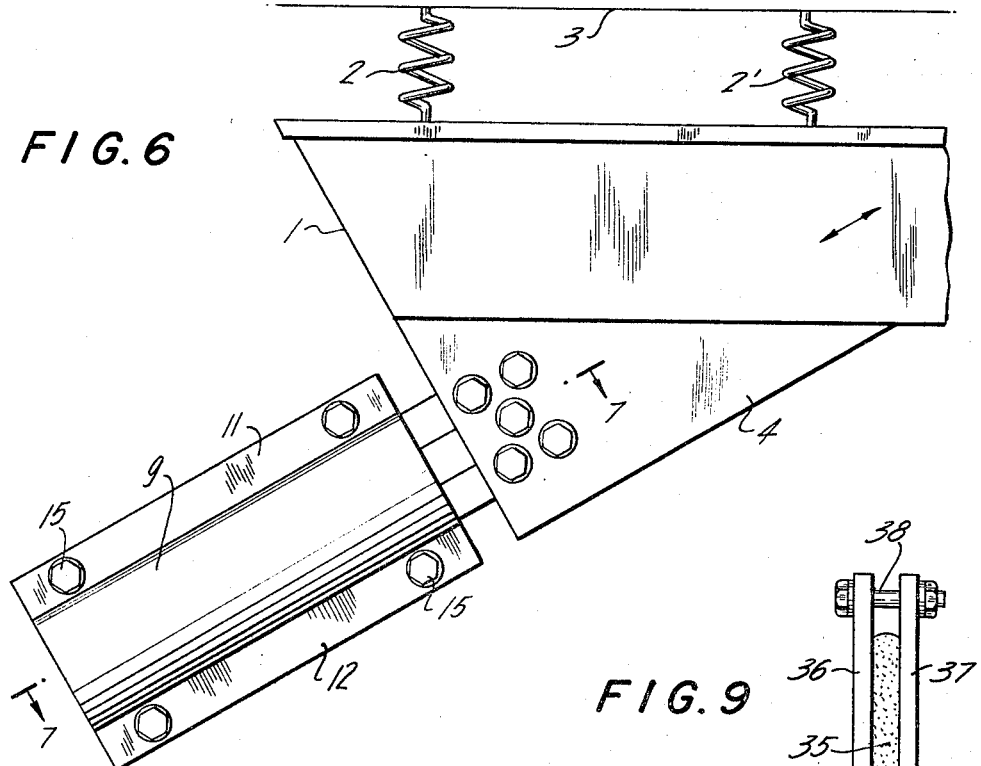
FIG. 6 is a side elevation of a second embodiment according to the invention.
Figure 7:
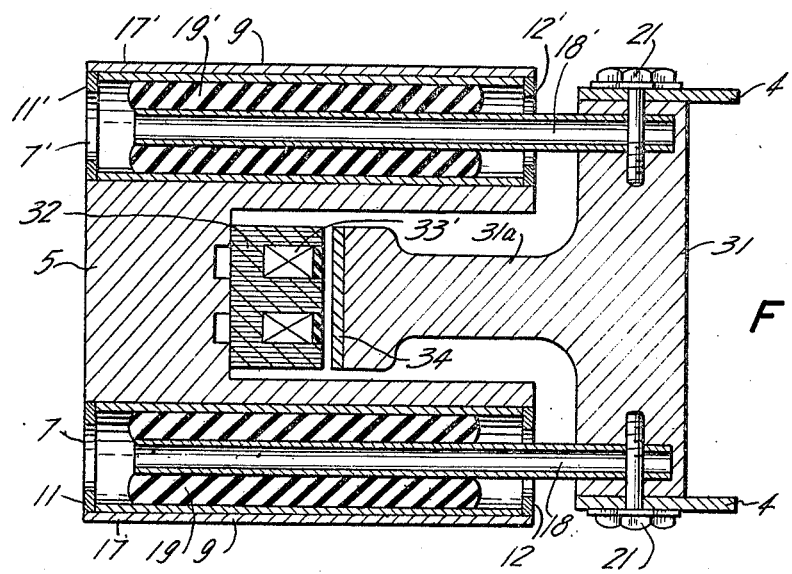
FIG. 7 is a cross-sectional view taken along the line 7—7 of FIG. 6.

A second embodiment of the invention is shown in FIGS. 6 and 7. The inner cylinders 18 and 18' of the cylindrical resilient rubber springs 16 and 16' are fixed to a connection member 31. The connection member 31 is fixed to the transfer trough 1 by fittings 4 and has a projecting portion 31a which extends into a recess formed in the holder 5. Holder 5 has the shape of a capital letter U. The outer cylinder of each of the cylindrical resilient rubber springs 16 and 16' are fixed to holder 5 by means of caps as in the preivous embodiment. An electromagnet 32 is attached having an exciter coil 33 to holder 5 and is oriented so that the magnetic pole is directed toward the transfer trough and is positioned symmetrically with respect to the resilient rubber springs 16 and 16'. A moveable magnetic pole piece 34 is fixed to the projecting portion of member 31. The holder 5 and member 31 are proportioned so that adequate space is left between the pole piece 34 and the electromagnet 32 during relative vibratory motion between the holders and member 31.

Rectified alternating electric current supplied to the excitor coil 33 results in pulsating attraction between the electromagnet 32 and the pole piece 34. The direction of the electromagnetic attraction force is parallel to the shearing direction of the cylindrical rubber springs so that the transfer trough experiences linear vibratory motion in the axial direction of the rubber springs with the rubber springs providing a restoring force to reposition the holder with respect to the connecting member 31.

In an embodiment of the electromagnetic vibrator described, a vibrator with a capacity of 100 ton/hr. has a cylindrical resilient rubber element with an outer diameter of 25 mm. and a length of 260 mm. The dynamic spring constant in the shear direction is 240 kg./mm. and the structural weight on the drive side is 120 kg. and 60 kg. on the transfer side. In this application an A-C current of 50 cycles per second is applied through a rectifier to the electromagnet generating vibration at a frequency of 3,000 cycles per minute.

An alternative construction of the cylindrical rubber spring comprises a plurality of resilient hollow cylindrical rubber segments fixed in a straight line between the inner cylinder. This construction permits the simple variation of the spring constants of the rubber springs.

Figure 9:
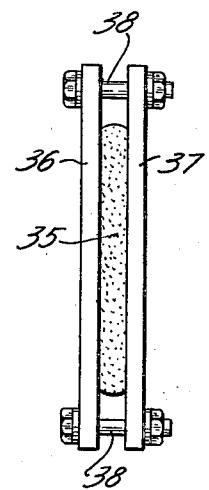
FIG. 9 is an end view of a conventional plate type rubber spring with compression plates.

Conventional vibrators have required several tons of layers of plate rubber such as shown in FIG. 8. Each of these layers has been subjected to precompression during assembly and installation by means of compression plates and bolts such as are shown in FIG. 9. The compression plates as well as the bolts must have great strength resulting in relatively high cost. The vibrator according to the invention eliminates the need for compression plates and also the need for application of precompression during installation thus resulting in a labor saving during installation. The ratio of the spring constant in the compression direction, $K_c$ to the spring constant in the shear direction, $K_s$, that is, $K_c/K_s$ is larger for a cylinder spring than for a plate type spring of comparable size, thus resulting in a larger spread between the resonant frequencies in the shear and compression directions with the result that the vibrator according to the invention provides substantially linear reciprocating motion with a single motor and a single eccentric weight. The vibrator according to the invention elminates the need for synchronously operating two motors and two eccentric weights or the use of bearings in order to remove unwanted components of vibration.

The cylindrical resilient rubber (a) in FIG. 1 is, in contrast to the plate-type resilient rubber (b) of FIG. 8, large in the spring constant in the compression direction DK, the spring constant in the shearing direction KS, and the ration of both constants $K_c/K_s$, as well as in the ratio $AL/AF$ of the pressure receiving area AL and the free area AF. This principle can well be expressed in the following numerical formula, in which actual values have been entered:

| Cylindrical resilient rubber spring | Plate-type resilient rubber spring |
|---|---|
| $K_c = 2.73 \dfrac{G \cdot 1}{\log_{10} \dfrac{r_2}{r_1} \left\{1 + \dfrac{1}{3}\left(\dfrac{r_2-r_1}{1}\right)^2\right\}}$ | $K_s = \dfrac{tl}{h} G \cdot J$ |
| | $J = \dfrac{1}{1 - 0.29\left(\dfrac{h}{t}\right)^2}$ |
| provided that $(r_2-r_1) \ll 1$ | provided that $\left(\dfrac{h}{t}\right) \neq 0$ |
| $K_c = 2.73 \dfrac{G \cdot 1}{\log_{10} \dfrac{r_2}{r_1}}$ | $K_s = \dfrac{t \cdot l}{h} G$ |
| $K_c/K_s = 2.5 + 1.645 \left(\dfrac{AL}{AF}\right)^2$ | $3 + 6.580 \left(\dfrac{AL}{AF}\right)^2 = \dfrac{K_c}{K_s}$ |
| $AL/AF = \dfrac{1}{r_1+r_2} \times \dfrac{1}{\log_e\left(\dfrac{r_2}{r_1}\right)}$ | $\dfrac{tl}{2(t-1)h} = \dfrac{AL}{AF}$ |

| Cylindrical resilient rubber | Plate-type resilient rubber |
|---|---|
| $K_s$(kg./cm.), 5,600 | $K_s$(kg./cm.), 1,500 |
| $AL/AF$, 124 | $AL/AF$, 20 |
| $K_c/K_s$, 256 | $K_c/K_s$, 30 |

Remarks:
G = Modulus of rigidity.
$r_1 = 5$ cm., $r_2 = 7$ cm.
$t = 10$ cm., $h = 2$ cm., $l = 50$ cm.
$G = 6$ kg./cm.².

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What I claim is:

1. A vibrator for producing vibration along a preferred direction comprising a base, at least one cylindrical elastomeric spring element mounted on said base and having a direction of shearing stiffness and a direction of compression stiffness with said spring element mounted on said base so that the direction of shearing stiffness is parallel to said preferred direction of vibration and with said shearing stiffness lower than said compression stiffness and with said base proportioned so as to apply a precompression force in the direction of compression stiffness, driving means mounted on said base, a rotatable eccentric weight connected to said driving means disposed so that unbalanced force due to rotation of said weight is in a plane parallel to the direction of said shearing stiffness of said spring element, fastening means for attaching a free end of said spring to an object to be vibrated to said base and said object form a two mass vibratory system having a resonant frequency in shear direction lower than the resonant frequency in the compression direction so that when said driving means are operated at a frequency below the resonant frequency in the shear direction, said object is subjected to substantially linear vibratory motion along said preferred direction.

2. A vibrator for producing vibration along a preferred direction comprising a rectangular base, a pair of cylindrical elastomeric springs each comprising a hollow cylindrical outer tube, a hollow cylindrical resilient elastomeric element disposed within said outer tube, an inner cylindrical member disposed partly within and extending beyond said elastomeric element with said components proportioned so that said elastomeric cylinder is in a state of radial precompression, with a direction of compression stiffness defined in the radial direction of said elastomeric cylinder and a direction of shear stiffness defined in the axial direction of said elastomeric cylinder, and with said stiffness in said shear direction less than said stiffness in said compression direction, means for attaching said outer cylinders to said base with said outer cylinders disposed on opposite sides of said base and parallel to each other, and parallel to said preferred direction, means for attaching said inner cylinders to an object to be vibrated and means for imparting to said base oscillatory movement whereby at a frequency close to the natural frequency of the two mass system formed by said base, said object and said shearing stiffness, to produce substantially linear vibratory motion of said object along said preferred direction.

3. A vibrator for producing vibration along a preferred direction as in claim 1 wherein the center of rotation of said eccentric weight is symmetrically disposed with respect of said springs.

4. A vibrator for producing vibration along a preferred direction as in claim 1 wherein the mass of said base is symmetrically disposed with respect to said springs.

5. A vibrator for producing vibration along a preferred direction as in claim 1 wherein said driving means are mounted on said base at a distance from said eccentric weight and said driving means and said eccentric weight are connected by means of a driving belt.

6. A vibrator for producing vibration along a preferred direction comprising a rectangular base having a recessed portion, and electromagnet disposed within said recess and fastened to said base, a pair of cylindrical elastomeric springs, each comprising a hollow cylindrical outer tube, a hollow cylindrical resilient elastomeric element disposed within said outer tube, an inner cylindrical member disposed partly within and extending beyond said elastomeric element, with said components proportioned so that said elastomeric cylinder is in a state of radial precompression, with a direction of compression stiffness defined in the radial direction of said elastomeric cylinder and a direction of shear stiffness defined in the axial direction of said elastomeric cylinder, and with said stiffness in said shear direction less than said stiffness in said compression direction, means for attaching said outer cylinders to said base with said outer cylinders disposed on opposite sides of said base, parallel to each other and parallel to said preferred direction of vibration, a connection member having a projecting portion entering said recess, electrical means for supplying current to said electromagnet, a pole piece fastened to said projecting portion and positioned opposite to said electromagnet and aligned so that supply of current by said electrical supply means results in the production of a force parallel to said shear direction of said cylindrical springs, means for attaching said inner members to said connection member, and means for attaching said connection members to an object to be vibrated, whereby said base, said springs and said object to be vibrated form a two mass vibratory system wherein operation of said electrical means causes pulsed attraction between said base and said object to be vibrated which is resisted by said cylindrical springs resulting in the production of linear vibratory motion of the two mass systems.

References Cited

UNITED STATES PATENTS

| | | | |
|---|---|---|---|
| 3,396,294 | 8/1968 | Makino | 310—81 |
| 3,312,841 | 10/1963 | Makino. | |
| 1,279,138 | 9/1918 | Nicoll | 310—81 X |

MILTON O. HIRSHFIELD, Primary Examiner

M. O. BUDD, Assistant Examiner